United States Patent [19]

Estes et al.

[11] 4,245,489
[45] Jan. 20, 1981

[54] KNURLING TOOL

[75] Inventors: Morton B. Estes; Charles S. Korn, both of St. Louis, Mo.

[73] Assignee: Sunnen Products Company, St. Louis, Mo.

[21] Appl. No.: 15,706

[22] Filed: Feb. 27, 1979

[51] Int. Cl.³ .................................... B21B 17/04
[52] U.S. Cl. ............................ 72/123; 72/126; 72/703
[58] Field of Search ............... 72/112, 120, 122, 123, 72/126, 703; 10/152 T

[56] References Cited

U.S. PATENT DOCUMENTS 3,258,838  7/1966  Tilton .................................... 29/406

FOREIGN PATENT DOCUMENTS 812676  4/1959  United Kingdom .................... 72/126

Primary Examiner—Lowell A. Larson
Attorney, Agent, or Firm—Charles B. Haverstock

[57] ABSTRACT

A knurling tool including an elongated body member having opposite ends and a bore extending therein from one end, the bore being spaced from and acutely angularly related to the axis of the body and extending in part through the side of the body, the bore having an enlarged portion intermediate the ends thereof, an elongated roller having an enlarged annular portion intermediate the ends thereof positioned in the body bore, with the enlarged roller portion being positioned in the enlarged bore portion, the enlarged roller portion being defined by an annular side surface angularly oriented relative to the axis thereof, and a pilot member cooperatively engageable with the body member and with the roller in position to trap and hold the roller in the bore.

10 Claims, 8 Drawing Figures

U.S. Patent     Jan. 20, 1981     4,245,489
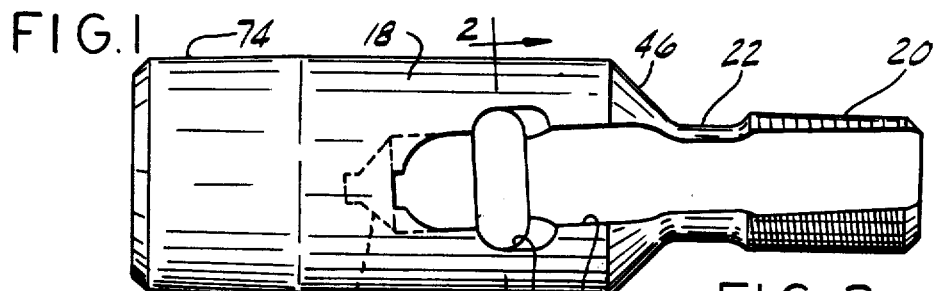
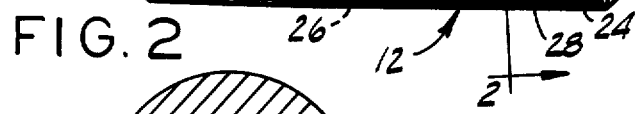
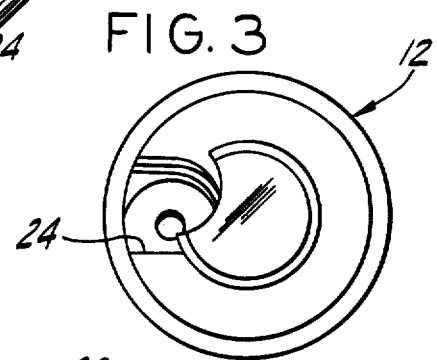
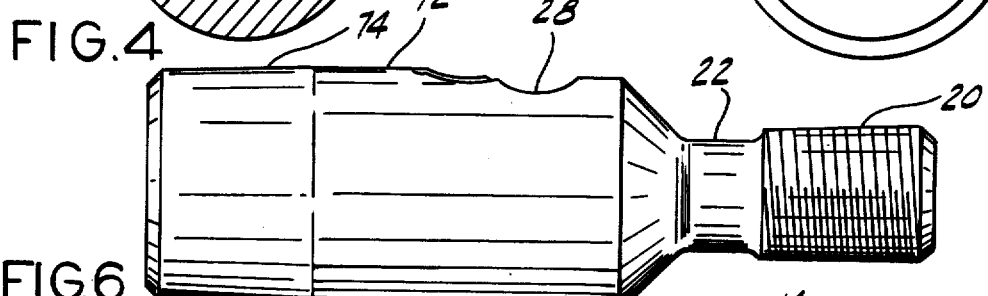
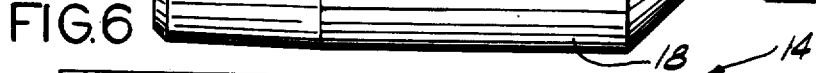
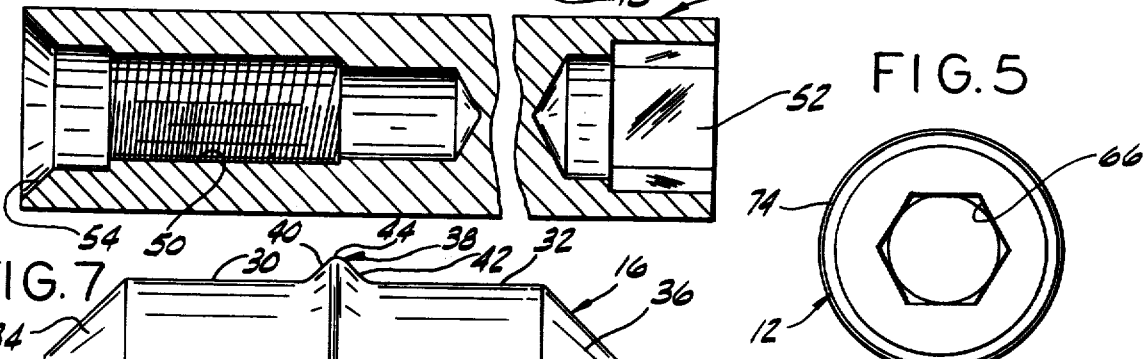
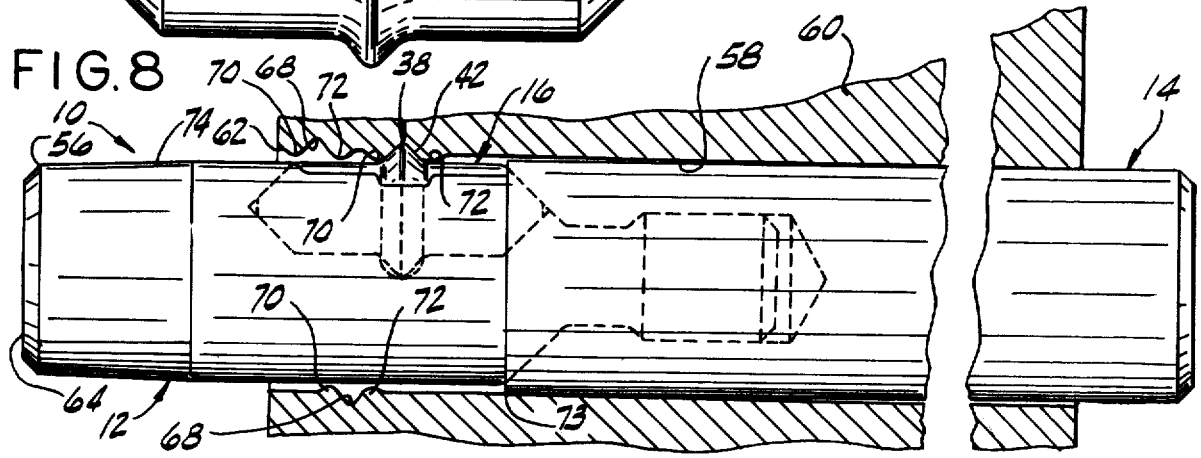

KNURLING TOOL

There are many applications where a knurling tool is required including applications where a cylindrical surface in a member is to be upset in order to reduce its effective diameter so that the bore surface can thereafter be honed or otherwise operated on to restore it to some precise desired size for some purpose such as to receive a cylindrical shaft or the like. Typical of applications where it may be desired to upset a bore surface in such a manner as to reduce its diameter are applications in which a bore receives the stem or shaft portions of members such as the valve stems of the valve members used in automobile engines and the like. In the past, when a valve stem became loose in its bore due to stem or bore wear it produced undesirable engine operation and often resulted in poor seating of the associated valve, with accompanying loss of engine efficiency, undesirable valve movements, loss of compression, and excessive noise and wear of the engine parts. To overcome these and other undesirable conditions it has been the practice to resurface the valve stem bores as by enlarging them and installing sleeves in them to restore them to some desired condition or to rebore them to some oversize condition and use valves with oversized valve stems. Both of these practices are expensive and time consuming and require the addition of numerous parts. These practices are also undesirable because it is not always possible to replace valves without requiring considerable other engine changes including resurfacing the valve seats and making other adjustments. Resurfacing valve stem bores can also produce lubrication problems, it can change the relationship between the valve and the valve seat, and it can cause other conditions which require other changes as well. The present invention resides in a novel knurling tool which enables continued use of the same or similar size valve parts and overcomes many of the disadvantages and shortcomings of the prior art. The present device also substantially reduces the time and labor required to recondition valve stem bores and other like bores.

It is therefore a principle object of the present invention to provide a relatively simple and easy to operate knurling tool.

Another object is to reduce the time, labor and expense of resurfacing bores that receive valve stems and other shaft members.

Another object is to make it possible to resurface bores to restore their original size by first reducing their effective diameters with minimum change to the workpiece in which the bores are located.

Another object is to make it much easier to start a knurling tool in a bore.

Another object is to improve the lubrication of valve members.

Another object is to minimize the number of new parts and adjustments that are needed when reconditioning engines and the like.

Another object is to substantially extend the useful life of the valve members used in internal combustion engines.

Another object is to minimize the need for oversized parts when reconditioning engines and other devices.

Another object is to provide a knurling tool that can be started in a bore in a workpiece without any advance preparation of the bore.

Another object is to teach the construction and operation of a knurling tool that has a relatively long useful life and can be restored to substantially new condition with a minimum of effort and a minimum of parts replacement.

Another object is to teach the construction and operation of a knurling tool that requires little or no special training to use.

Another object is to knurl bore surfaces using a desired pattern of movement of a knurling tool therethrough.

These and other objects and advantages of the present invention will become apparent after considering the following detailed specification of a preferred embodiment in conjunction with the accompanying drawing wherein:

FIG. 1 is a top plan view of the body portion of a knurling tool constructed according to the present invention;

FIG. 2 is a cross-sectional view of the body portion of the knurling tool shown in FIG. 1 taken on line 2—2 thereof;

FIG. 3 is a right end view of the member shown in FIG. 1;

FIG. 4 is a side view of the body portion of the subject knurling tool;

FIG. 5 is a left end view of the body portion shown in FIG. 4;

FIG. 6 is a cross-sectional view through the pilot portion of the subject knurling tool;

FIG. 7 is an enlarged side elevation view of a typical roller member employed in the subject tool; and FIG. 8 is a side elevational view of the subject knurling tool in assembled and operative condition and shown in position extending into a workpiece bore to be knurled.

Referring to the drawings more particularly by reference numbers, number 10 in FIG. 8 refers to a knurling tool constructed according to the teachings of the present invention. The tool 10 includes a body portion 12, a pilot portion 14 and a roller 16. The structural details of each of these members are important to the operation of the present tool which involves initially forcing the tool part way into a workpiece bore to be knurled, and thereafter rotating the tool while it is in the bore by applying axial and rotational force to knurl or upset the bore surface in such a manner that the bore, after being knurled, will have an helical groove formed in it with adjacent inwardly extending ridges, and a smaller effective inside diameter than it had before being knurled. By the bore having a smaller diameter after being knurled, provides the opportunity to resurface the bore as by honing the internally extending ridges to restore it to its original or to some other desired diameter so that it can continue to receive the same or a similar diameter member therein. Typical of bores which can beneficially by knurled using the subject tool are the bores in which the valve stems of an internal combustion engine are positioned. Obviously this is only one of many possible applications for the subject knurling tool.

In FIGS. 1-5, the body portion 12 of the subject tool is shown in detail. The body 12 has an elongated cylindrical portion 18 which is connected to a smaller diameter threaded end portion 20 by a still smaller diameter connecting portion 22. An open sided bore 24 is formed in the member 12 and extends through the threaded end portion 20 past the portion 22 and into the cylindrical portion 18. The bore 24 is acutely angularly related to the axis of the member 12 as clearly shown in the top view of FIG. 1, and the bore 24 is in a plane parallel to the axis of the member 12 as viewed in FIG. 4. The angular relationship of the bore 24 to the axis determines the pitch of the helical groove that will be formed in a workpiece bore when the subject device is operated therein.

The bore 24 is partially open along most of its length in the member 12 except for a small end portion 26 which is located in the cylindrical portion 18. The bore portion 26 is rounded or conical shaped, and the bore 24 has an annular enlarged portion 28 located at an intermediate position. The bore 24, including the enlargement 28, is designed and constructed to receive and accomodate the roller 16 as shown in detail in FIG. 7. The roller 16 is an elongated member having aligned cylindrical portions 30 and 32 with similar rounded, conical or frusto conical shaped ends 34 and 36 respectively. The roller 16 also has an annular outwardly extending ridge 38 at an intermediate location. The ridge 38 is defined by oppositely sloping annular surfaces 40 and 42 and a connecting rounded or flat surface portion 44 therebetween. The surfaces 40 and 42 are preferrably oriented to be at an angle of about 45° relative to the axis of the roller and the curvature of the rounded or flat portion 44 is selected to produce a desired knurling effect on the surface in which the subject tool is to be used. The slope of the surfaces 40 and 42 is selected to make it possible by tapping on the subject tool at one end to have the tool, including the portion 38, move under pressure into a bore to be knurled without otherwise having to prepare the bore in advance to receive the tool. This is possible because the slope of the opposite surfaces 40 and 42 of the portion 38 enables it to be relatively easily forced into the bore with relatively little tapping force being required. It is to be understood, however, that the taper of the portion 38 can be increased or decreased as required depending on parameters such as the tolerances between the parts, the hardness of the metal to be knurled, and the curvature of the portion 44. It is also contemplated to slope one or both sides of the ridge 38, although it is preferred to similarly slope both opposite sides so that the roller 16 cannot be installed backwards in the tool. If a single slope ridge is used it can be made to be a more gradual slope for a given width of the ridge 38.

The roller 16 is installed in the bore 24 by inserting one end such as the end 34 into the bore 24 toward the closed bore end 26 to a position to allow the annular ridge 38 to move down into the enlarged bore portion 28 (FIG. 1). The opposite or free end 36 of the roller 16, which is also rounded or frusto conical in shape, extends in the bore 24 to adjacent an annular beveled surface 46 on the body member 12. Thereafter when the pilot member 14 is threadedly attached to the body member 12, as will be explained, it will trap the roller 16 and hold it in place in the bore 24.

The structural details of the pilot 14 are shown in FIGS. 6 and 8. The pilot 14 is preferrably an elongated cylindrical member having a threaded bore 50 formed extending into one end thereof. The opposite end of the pilot 14 has a socket 52 for receiving a wrench such as an Allen wrench or other tool used to tighten the pilot 14 onto the body 12. The free end of the pilot 14 adjacent to the threaded bore 50 is defined by a tapered surface 54 which matches the taper of the tapered body surface 46 so that when the pilot 14 is threaded onto the threaded body portion 20, the tapered surface 54 moves against and engages the tapered body surface 46. In so doing the pilot 14 traps the roller 16 and prevents it from falling out. However, because of the shape of the roller end portions 34 and 36, the roller 16 is still relatively free in the bore 24 and is able to rotate in its position. However, when the tool is being operated, the end thrust required to drive it through the bore means that most, if not all, of the thrust force will occur between the conical roller portion 34 and the conical surface 26 of the body bore, and relatively little or none will occur between the conical roller portion 36 and the surface 54 of the pilot 14. Even so the relative looseness of the roller 16 in its mounting enables it, including the annular ridge 38, to rotate while engaged with a bore surface being knurled.

Referring to FIG. 8, it can be seen that the body 12 is somewhat smaller in diameter than the diameter of the pilot 14. This is done intentionally to facilitate operation of the tool by providing some clearance in the tool to prevent the tool from binding which would otherwise occur if the diameter of the body portion 12 were the same as the diameter of the bore in the workpiece being knurled. Also, the free end of the body 12, which is the last portion of the tool to move through a workpiece bore, is tapered somewhat reaching its smallest diameter at trailing end 56. This is done to allow the entire tool to tip or to tilt somewhat as it moves through the bore to prevent the tool from rubbing on or burnishing the bore surface after it has been knurled and undesireably flattening the ridges formed along the knurl, and the taper of the end portion 74 of the body portion 12 also minimizes or prevents the tool from mushrooming at its free end which is the end that is tapped on to start the tool in a bore.

In FIG. 8 the tool 10 is shown positioned in bore 58 in workpiece 60. To start the tool 10 in the workpiece bore 58, the pilot 14, which has a diameter that is very close to the same diameter as the workpiece bore 58, is inserted into the bore 58. The insertion of the tool is stopped by the side surface 42 of the ridge 38 on the roller 16 moving against the end edge 62 of the workpiece 60 adjacent to the bore 58. The operator then takes a mallet or hammer or other like tool and taps on free end 64 of the tool 10 with sufficient force to drive the tool into the bore 58 by driving the ridge 38 into the workpiece bore 58. It is only necessary that the ridge 38 move into the bore 58 a relatively short distance in order for the tool to be operated. When the tool 10 is in the position described, the operator will engage the tool 10 with means to advance it through the workpiece bore 58. This can be done manually using a suitable wrench type tool or it can be done using a motor driven wrench type tool. The free end of the tool 10 has a wrench socket 66 which receives the wrench means that is used to drive it. When a driving means are engaged with the socket 66, forward pressure is applied to the driving means as the driving means are rotated. This causes the tool 10 to rotate and in turn causes the ridge 38 of the roller 16 to press against the surface of the bore 58 forming a helical groove 68 (FIG. 8) as the tool moves therethrough. The forward advancement of the tool 10 is greatly aided by the acute angular relationship between the roller 16 and the axis of the tool.

The groove 68 is formed by the pressure of the ridge 38 on the bore surface and this outward pressing action causes the workpiece metal adjacent opposite sides of the groove 68 to expand or be forced inwardly to form helical ridges 70 and 72 along both opposite sides of the groove 68. These inwardly extending ridges 70 and 72 actually reduce the diameter of the bore 58, which is the very condition that is desired to be produced by the present tool. The fact that the body portion 12 of the tool is somewhat smaller in diameter than the diameter of the bore 58 and is tapered as at 74 means that little or no rubbing of the tool against the ridges 70 and 72 takes place. This is important and means that there will be a relatively substantial reduction in the diameter of the workpiece bore as a result of knurling for later resizing. In this regard it should be noted that the subject tool is designed to pass through a workpiece bore only once. If it were passed through the same bore a second time the pilot 14 would rub on the ridges 70 and 72 and prevent later accurate resizing and the tool would also otherwise undo what it accomplished during its previous knurling operation.

Referring again to FIG. 8 it can be seen that the force of the ridge 38 against the bore surface 58 causes the greatest opposing thrust force to be applied against the left end of the pilot member 14 opposite the ridge 38 at 73. This also causes some slight canting of the entire tool including the pilot 14 in the bore 58 which is not objectionable to its operation.

If, during operation of the subject tool insufficient axial force is applied to the tool to cut a spiral or helical shaped groove such as the groove 68, it is possible that the roller ridge 38 might fall back into a previously formed groove portion even though the roller is angularly oriented to reduce this possibility. It has been found that if this happens that it is a relatively simple matter to increase the axial force or tap on the tool to restart the formation of the groove. It has not been found to be particularly objectionable to the surface being knurled to have this happen.

As stated above, one of the places where the present tool has been used with particular benefit is in resurfacing the bores in engine blocks in which the valve stems are located. The present tool can accomplish this without requiring any reboring, resleeving, or the use of oversize parts. This enables continued use of the same or similar size valve members without replacement and with minimum of bore regrinding and reshaping. These are important considerations that result in considerable savings when reconditioning engine blocks and the associated valves. The present tool is not limited to use in valve bores however, and can be used on any bore, and especially relatively small diameter bores, where it is desired for some reason to reduce the existing bore diameter for resizing or otherwise.

Another benefit obtained by using the present tool is that it establishes a helical groove in the bore surface which can serve as a lubricant channel. This is an advantage when the bore is occupied by a movable member such as a movable valve stem.

Thus there has been shown and described a novel knurling tool which fulfills all of the objects and advantages sought therefor. It will be apparent to those skilled in the art, however, that many changes, modifications, alterations and other uses and applications of the subject knurling tool are possible. All such changes, modifications, alterations and other uses and applications which do not depart from the spirit and scope of the invention are deemed to be covered by the invention which is limited only by the claims which follow.

What is claimed is:

1. A tool for knurling the surface of a bore comprising a first elongated member having opposite ends and a bore extending into said member from one end thereof, said one end including a reduced diameter male threaded portion, said bore being spaced from the axis of the member so that at least a part of the bore intersects the side of the member, said bore terminating in an annularly tapered end portion forming a socket in said first elongated member and an enlarged bore portion at a location intermediate the ends thereof, an elongated roller member having tapered opposite end portions and an annular enlarged diameter portion at an intermediate location, one of said tapered end portions being engageable with the tapered bore end portion and being retained thereby in the bore, said enlarged diameter roller portion having an annular tapered surface on at least one side thereof, said roller being positioned in the bore with the enlarged portion thereof positioned in the enlarged bore portion, and an elongated guide member having a threaded bore extending therein from one end and an annular tapered end surface outwardly of said bore, said threaded bore being cooperatively engageable with the male threaded portion on the first elongated member and threadedly movable thereon to a position where the tapered end surface thereon traps and retains the roller member in the bore, the diameter of the guide member being larger than the diameter of the first member.

2. The tool of claim 1 wherein the bore is oriented at an acute angle relative to the axis of the first member.

3. The tool of claim 1 wherein the enlarged roller portion has annular tapered surfaces on opposite sides thereof.

4. The tool of claim 1 wherein the first member has a tapered end portion opposite from where it is attached to the guide member.

5. The tool of claim 1 wherein one end of the first member has a socket formed therein for receiving a wrench like member.

6. The tool of claim 1 wherein the bore in the first member is in a plane that is parallel to a plane through the axis of the member.

7. A knurling tool comprising a cylindrical body member having a side wall, an axis, opposed ends, and an off-axis bore extending into the body from one of said ends intersecting the side wall thereof along a portion of its length and terminating in a tapered end portion, said bore having an enlarged bore portion at an intermediate location, a roller position in the bore, said roller having tapered opposite end portions one of which extends into an cooperates with the tapered bore end portion and the opposite of which extends to adjacent the open bore end, said roller having an annular enlarged diameter portion at an intermediate location for cooperating with the enlarged bore portion, said enlarged diameter roller portion being defined by annular opposed surfaces oriented at opposite acute angles relative to the axis of the roller, and means to retain the roller in the bore including an elongated cylindrical pilot member, said pilot member and said body having cooperatively engageable threaded means thereon to connect the members together in substantial alignment, said pilot member having a tapered end surface that cooperatively engages the cylindrical body member to trap the roller in the bore, the diameter of the pilot member being somewhat larger than the diameter of the body member.

8. The knurling tool of claim 7 wherein the off-axis bore is acutely angularly related to the axis of the body member.

9. The knurling tool of claim 7 wherein the roller member is an elongated member having cylindrical portions of approximately the same diameter as the body bore connected by the enlarged diameter portion, and the tapered opposite end portions.

10. The knurling tool of claim 7 wherein the enlarged roller portion extends outwardly further from the axis of the body than the pilot member.

* * * * *